(12) United States Patent
Birk et al.

(10) Patent No.: US 11,028,960 B2
(45) Date of Patent: Jun. 8, 2021

(54) HOLDING GEAR

(71) Applicant: SACS GmbH, Empfingen (DE)

(72) Inventors: Martin Birk, Rottweil (DE); Oliver Dratius, Albstadt (DE); Rolf Kuhm, Sindelfingen (DE)

(73) Assignee: SACS GMBH, Empfingen (DE)

( * ) Notice: Subject to any disclaimer, the term of this patent is extended or adjusted under 35 U.S.C. 154(b) by 112 days.

(21) Appl. No.: 16/415,410

(22) Filed: May 17, 2019

(65) Prior Publication Data

US 2019/0353296 A1 Nov. 21, 2019

(30) Foreign Application Priority Data

May 18, 2018 (DE) .......................... 102018207930.7

(51) Int. Cl.
*F16M 11/04* (2006.01)
*F16M 13/02* (2006.01)
*F16M 11/14* (2006.01)
*E05B 73/00* (2006.01)

(52) U.S. Cl.
CPC ......... *F16M 11/041* (2013.01); *F16M 11/046* (2013.01); *F16M 11/14* (2013.01); *E05B 73/0082* (2013.01); *F16M 13/02* (2013.01)

(58) Field of Classification Search
CPC .... F16M 11/041; F16M 11/046; F16M 11/14; E05B 73/0082
See application file for complete search history.

(56) References Cited

U.S. PATENT DOCUMENTS

| 4,436,271 | A | * | 3/1984 | Manso | ................... | A47B 19/00 |
| | | | | | | 248/452 |
| 9,568,141 | B1 | * | 2/2017 | Zaloom | ................... | F16M 11/24 |
| 2004/0089781 | A1 | * | 5/2004 | Anderson | ............ | F16M 11/041 |
| | | | | | | 248/329 |
| 2011/0049321 | A1 | * | 3/2011 | Wu | ....................... | F16M 13/022 |
| | | | | | | 248/339 |
| 2012/0074272 | A1 | * | 3/2012 | Hull | ..................... | F16M 11/041 |
| | | | | | | 248/122.1 |

FOREIGN PATENT DOCUMENTS

| DE | 102016200100 A1 | 7/2017 |
| DE | 102016200100 A1 | 7/2017 |

\* cited by examiner

*Primary Examiner* — Tan Le
(74) *Attorney, Agent, or Firm* — Hoffmann & Baron, LLP

(57) ABSTRACT

Holding gear for temporarily fixing a plate-shaped object, in particular a tablet computer, having a first holder which includes a coupling arrangement for connection to a supporting gear and a first receiving section for a positive reception at least in two spatial directions of a first narrow side of the plate-shaped object, and having a second holder, which has a second receiving section for receiving a second narrow side of the plate-shaped object in a form-fitting manner at least in two spatial directions, and further including a flexibly designed traction belt which is connected to the first holder and the second holder and which is designed for transmitting traction force between the first holder and the second holder for fixing the plate-shaped object.

7 Claims, 4 Drawing Sheets

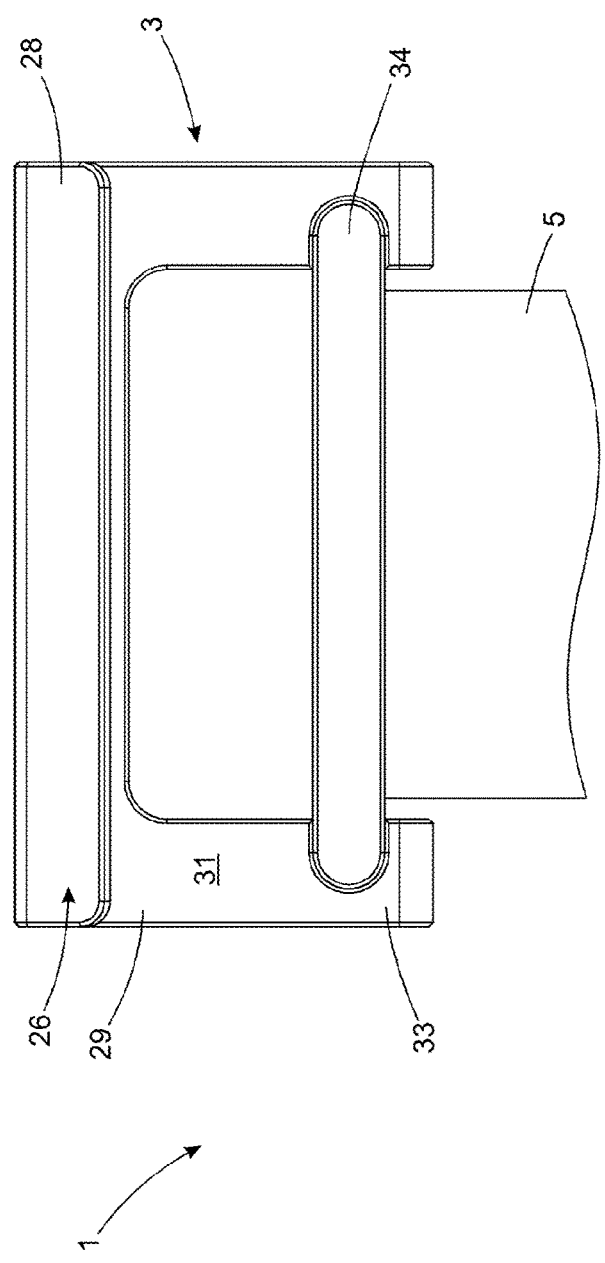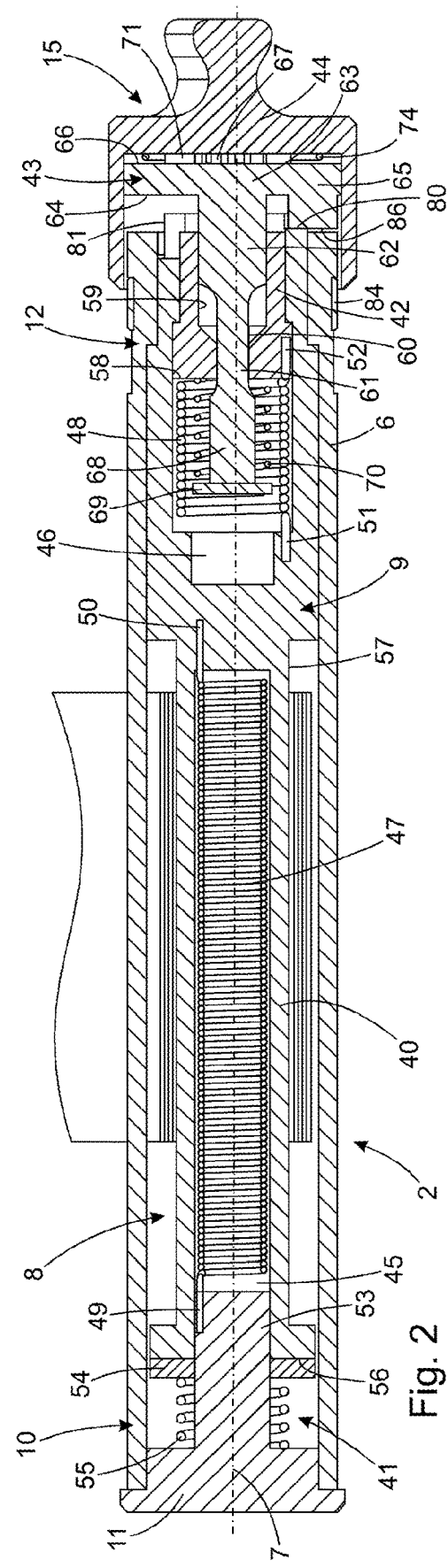
Fig. 2

HOLDING GEAR

BACKGROUND OF THE INVENTION

The invention concerns a holding gear for the temporary fixing of a plate-shaped object, in particular a tablet computer or a smartphone. In particular, the invention concerns such a holding gear which is designed for use in an aircraft, such as a helicopter, a commercial aircraft or a private aircraft.

Due to the increasing range of functions of tablet computers, they are increasingly being used in civil aviation. For example, a tablet computer can be used to display maps, weather data or other information required for flight operations, which can be used to supplement the information provided by the on-board instruments permanently installed in the aircraft. As an example, a tablet computer has at least a substantially plate-shaped shape and is typically operated by means of a touch-sensitive screen that determines the largest surface area of the tablet computer. Usually, a width and height of the tablet computer are significantly greater than a thickness of the tablet computer. For use in an aircraft, a holding gear for such a tablet computer shall be designed, in the context of its intended use, to hold the tablet computer safely and to maintain a predetermined position for the tablet computer in the event of large accelerations, such as those occurring during the landing process for the aircraft or when flying through turbulent air layers.

SUMMARY OF THE INVENTION

Accordingly, the task of the invention is to provide a holding gear which enables the reliable fixing of the plate-shaped object, in particular a tablet computer.

According to the invention the holding gear comprises a first holder, which has a coupling arrangement for connection to a supporting gear and a first receiving section for positively receiving a first narrow side of a plate-shaped object at least in two spatial directions, a second holder, which has a second receiving section for positively receiving a second narrow side of the plate-shaped object at least in two spatial directions, and a flexible traction belt which is connected to the first holder and the second holder and which is designed for a transmission of traction force between the first holder and the second holder for fixing the plate-shaped object.

The first holder comprises a coupling arrangement which may be adapted for direct attachment to an aircraft fairing member or fuselage structure serving as support means or for coupling to a swivel arm or telescopic arm serving as support means, which in turn may be connected to a fairing member or fuselage structure. As an example, the coupling arrangement can be used as a component of a ball joint, in particular a lockable ball joint, or a swivel joint, in particular a lockable swivel joint.

In order to enable reasonable operation of a plate-shaped object accommodated in the holding gear and formed in the manner of a tablet computer, it is necessary that a largest surface of the plate-shaped object, designed in particular as a touch-sensitive screen, can be accommodated in the holding gear in such a way that only edge areas of this largest surface are covered by the holding gear. This is achieved by the fact that both the first holder and the second holder comprise receiving sections which engage on narrow sides of the plate-shaped object and which are aligned oppositely to one another and each adjoin the largest surface and preferably grip around the narrow side of the plate-shaped object in such a way that the latter is fixed in a positive-locking manner in at least two spatial directions perpendicular to one another. A fixing of the plate-shaped object in a third spatial direction oriented perpendicularly to the aforementioned two spatial directions can in particular be ensured by a frictional connection between the object and the holding gear, whereby also geometrically differently shaped plate-shaped objects, which differ in particular with regard to an edge length of their generally rectangular largest surface, can be accommodated in the holding gear.

Furthermore, the reception of geometrically differently designed plate-shaped objects in the holding gear is facilitated by the fact that the second holder is not rigidly connected to the first holder, but rather comprises a flexible traction belt which is adapted to transmit traction forces between said second holder and said first holder. This transmission of traction forces ensures on the one hand that both the second holder and the first holder rest reliably against the opposing narrow sides of the plate-shaped object. On the other hand the transmission of traction forces also ensures the desired frictional coupling between the holders and the plate-shaped object. Preferably, the traction belt is designed in such a way that, when the holding gear is used in accordance with its intended purpose, it does not undergo any appreciable elastic elongation and, at least with respect to one spatial direction, has a low modulus of resistance to bending, so that a section of the traction belt which is not required for fixing the object can be stowed away in a space-saving manner, for example by winding.

Advantageous further embodiments of the invention are the subject of the subclaims.

It is expedient if the first receiving section is designed in the form of a channel o groove and/or has a first U-shaped profile along a first axis of extension and/or if the second receiving section is designed in the form of a channel or groove and/or has a second U-shaped profile along a second axis of extension. This ensures the desired positive locking of the plate-shaped object in at least two perpendicular spatial directions. Preferably the U-shaped profiling of the first receiving section and/or the second receiving section is preferably designed in such a way that the U-limbs of the respective receiving section are not aligned completely parallel to one another, but rather starting from a connection section between the two U-limbs have an increasing distance from each other. This allows plate-shaped objects of different thicknesses to be accommodated in the respective receiving section without questioning the fixing in two mutually perpendicular spatial directions. Furthermore, the two mounting sections are aligned in such a way that free end areas of the U-limbs of one mounting section each point in the direction of the opposite mounting section. Preferably the respective receiving section has a constant, U-shaped profile along a rectilinear axis of extension. Alternatively, it may be provided that at least one of the receiving sections is channel-shaped, whereby a constant profiling along an axis of extension need not necessarily be maintained here.

It is preferred that the first receiving section and/or the second receiving section has a U-shaped profile with a shorter U-leg and a longer U-leg and that the traction belt extend along the longer U-leg, in particular is attached to the longer U-leg. The longer U-leg, which may be provided on the first receiving section, serves in particular to support the plate-shaped object on the rear side so that it cannot tilt in the holding gear, for example when a tablet computer is used in accordance with its intended purpose, in which a user touches a touch-sensitive screen of the tablet computer, such as typing or wiping. The longer U-leg, if any, provided on the second receiving section ensures additional support of the second holder on a rear side of the plate-shaped article, thereby preventing the second holder from tilting with respect to the plate-shaped article. Preferably, the traction belt is provided to extend on a rear side of the respective receiving section, this rear side facing away from the region of the holding gear which is designed to receive the plate-shaped object.

In the case of an advantageous further embodiment of the invention, it is provided that a winding apparatus is mounted on the first holder, the winding apparatus comprising a winding shaft which is rotatably mounted on the first holder and which is surrounded by an end region of the traction belt, which winding shaft is designed for winding up and unwinding the traction belt, which is in particular designed as a flexible webbing. On the one hand, by unwinding the traction belt from the winding shaft, the winding apparatus enables the size of the holding gear to be adapted to the size of the plate-shaped object to be accommodated in the holding gear, since the second holder can take up a preferably freely adjustable distance from the first holder within a predeterminable region. On the other hand, the winding apparatus enables the plate-shaped article to be reliably secured in the holding gear by, after the plate-shaped article has been inserted into the holding gear, at least a portion of the traction belt can be wound up on the winding shaft by rotation of the winding shaft in order thereby to provide a traction force between the winding apparatus, which is attached to the first holder, and the second holder. The traction belt may be, for example, a link chain of metal links or plastic links, a rope of natural fibres and/or plastic fibres, a tape, in particular a woven tape of natural fibres and/or plastic fibres or a film, in particular a plastic film. The traction belt is preferably realized as a flexible webbing as known from the field of safety belts for aircraft and motor vehicles. The webbing is in particular a fabric made from a plurality of threads, in particular plastic threads, which preferably have a low elastic elongation capability in the direction of their longitudinal extension and a low modulus of resistance to bending transversely to their longitudinal extension, so that the webbing made from the threads also has a low elastic elongation capability in the direction of its longest edges and can be bent in a spatial direction transversely to the longest edges even if only a low force is exerted.

In a further configuration of the invention it is provided that the winding shaft is assigned a pretensioned spring arrangement supported on the first holder for providing a traction force on the traction belt, in particular depending on a distance of the second holder from the first holder, and/or that a winding axis of the winding shaft is aligned parallel to the extension axis of the first receiving section. The spring arrangement can, for example, be in the form of a helical spring which is at least largely accommodated in a bore of the winding shaft and is fixed to the winding shaft with a first winding end. Furthermore, a second winding end of the spring arrangement is fixed to the holder, so that when the winding shaft rotates about a winding axis during unwinding of the traction belt from the winding shaft energy is stored in the spring arrangement. With the help of the stored energy, it can be ensured that the tensioning gear is subjected to an increasing tension force by increasing the distance between the second holder and the first holder. This always ensures that the second holder is temporarily held on a narrow side of the plate-shaped object which is inserted into the holding gear. Furthermore the increasing traction force from the winding shaft to the traction belt takes into account the weight of the plate-shaped object, which typically is related with the size of the plate-shaped object. In order to ensure that the traction belt and the associated spring arrangement are loaded as symmetrically as possible, it is advantageous if the winding axis of the winding shaft is aligned parallel to the extension axis of the first receiving section, since in this case it can be assumed that the traction belt is not twisted in itself when the second holder abuts against the narrow side of the plate-shaped object, so that undesired forces on the traction belt and the spring arrangement can be avoided.

It is advantageous if the winding shaft is assigned a blocking mechanism for a rotationally fixed attachment of the winding shaft to the first holder, which comprises an actuating element which is designed for manual torque introduction onto the winding shaft. The blocking mechanism allows the plate-shaped object to be secured to the holding gear after an advantageous distance has been set between the first holder and the second holder. Preferably it is intended to activate the blocking mechanism at a time when the plate-shaped object has been received between the second holder and the first holder and the energy stored in the spring assembly has been called up at least to such an extent that the second holder lies positively against the associated narrow side of the plate-shaped object. From this situation, a user may, if necessary, by manually actuating the actuator, perform an additional winding movement of the winding shaft to increase the traction force or pulling force in the traction belt to such an extent that the plate-shaped object is securely received in the holding means to activate the blocking means in a subsequent actuating step and thereby maintain the clamping of the plate-shaped object permanently until the blocking means is released.

It is useful if a coupling spring is provided for the force-transmitting coupling of the actuating element with the winding shaft, wherein on the holder and on the actuating element corresponding supporting surfaces are formed for torque support between actuating element and holder. For example the corresponding supporting surfaces may be side surfaces of axially projecting projections or axially inserted recesses on the holder and/or on the actuating element. Due to their alignment, these side surfaces enable the transmission of forces resulting from torques acting between the holder and the actuating element and, in particular, aligned in a tangential direction with respect to a circle around the winding axis. The torque between the holder and the actuator results, in particular, from a traction force exerted by the second holder on the traction belt and from there on the actuator via the winding shaft and intended to be supported accordingly on the holder in order to prevent undesired rotation of the winding shaft and loosening of the traction belt. In addition, a portion of the torque may result from an elastic deformation of a coupling spring which is intended for kinematic coupling of the actuator to the winding shaft and which is deformed during manual actuation of the actuator to tension the traction belt for proper attachment of the plate-like object. The task of this coupling spring, which can be designed, for example, as a circular cylindrical helical spring, is in particular to enable a rotational alignment of the actuating element with respect to the holder in such a way that the mutually corresponding supporting surfaces provided on the holder and on the actuating element can be brought into contact with one another in order to ensure the desired torque support for the actuating element while maintaining a minimum traction force on the traction belt, without an excessive traction force being applied to the traction belt in this case.

In an advantageous further embodiment of the invention, it is provided that the actuating element is mounted on the winding shaft so as to be linearly movable between a release position and a blocking position and that an axial spring is arranged between the winding shaft and the actuating element in order to determine the blocking position as a preferred position for the actuating element, wherein the actuating element and the winding shaft have mutually corresponding control surfaces for presetting an angular position between the actuating element and the winding shaft for taking up the blocking position. Due to the linear movement of the actuating element relative to the winding shaft, a blocking position can be assumed or released. For this purpose it is provided that the mutually corresponding supporting surfaces on the holder and on the actuating element have an axial extension which is selected in such a way that, in the event of a linear movement of the actuating element from the blocking position, in which there is engagement between the supporting surfaces, into the release position, it can be effected that the engagement between the supporting surfaces is cancelled. In order to facilitate operation for a user of the holding gear, in particular for fixing a plate-shaped object to the holding gear, an axial spring is arranged between the winding shaft and the actuating element, which axial spring is pre-tensioned in such a way that, in the blocking position, it has a lower internal tension and, in the release position, has a higher internal tension than in the release position, so that the blocking position is intended as a preferred position for the actuating element. In order to achieve an additional force application to the traction belt, which is desirable for the secure fixing of the plate-shaped object in the holding gear and which exceeds the traction force applied to the traction belt by the spring arrangement, corresponding control surfaces are formed on the actuating element and on the winding shaft, which only permit the actuating element to assume the blocking position when the actuating element has been rotated relative to the winding shaft by an angular amount predetermined by the control surfaces. In the course of this rotational movement of the actuating element relative to the winding shaft, an elastic deformation of the coupling spring, which is provided between the actuating element and the winding shaft, takes place. By way of example, the design of the control surfaces on the actuating element and on the winding shaft, which are aligned in axial direction in particular and are regionally opposite one another, it can be achieved that the actuating element must first be rotated by an angular amount of 120 degrees relative to the winding shaft until the control surfaces permit the linear movement of the actuating element from the free position into the blocking position.

In a further configuration of the invention, it is provided that the actuating element comprises an actuating part and a coupling part, wherein the coupling part is designed for force transmission from the actuating part to the coupling spring and wherein the actuating part is mounted unidirectionally rotationally movable on the coupling part. This makes it easier to operate the holding gear, in particular during the fixing process for the plate-shaped object, since the actuating part of the actuating element can be designed in the manner of a freewheeling hub (relative to the coupling part on account of the unidirectional rotary movable bearing), as is known from bicycle rear hubs. After the second holder has been attached to the plate-shaped object, it can first be turned into a favourable position in order to then initiate the additional torque for the final attachment of the plate-shaped object to the holding gear from the actuating part via the coupling part and the coupling spring to the winding shaft. It is preferable that the control surface of the actuating element is formed on the coupling part so that a relative rotation of the actuating part relative to the coupling part has no influence on a rotational position of the mutually corresponding control surfaces and the angular range defined thereby which the actuating element is to sweep over relative to the winding shaft before it can be transferred from the free position into the blocking position.

The first holder and/or the second holder are preferably designed as extruded aluminium parts. This enables a cost-effective production of the holders as high-quality aluminium parts, whereby it can be provided that the first holder and/or the second holder are post-processed before use in the holding gear, in particular by machining such as turning or milling or by surface coating. Alternatively, the first holder and/or the second holder can be designed as plastic injection moulded parts or as plastic extrusion parts.

BRIEF DESCRIPTION OF THE DRAWINGS

An advantageous form of the invention is shown in the drawing. Here shows.

DETAILED DESCRIPTION

Figure 1:
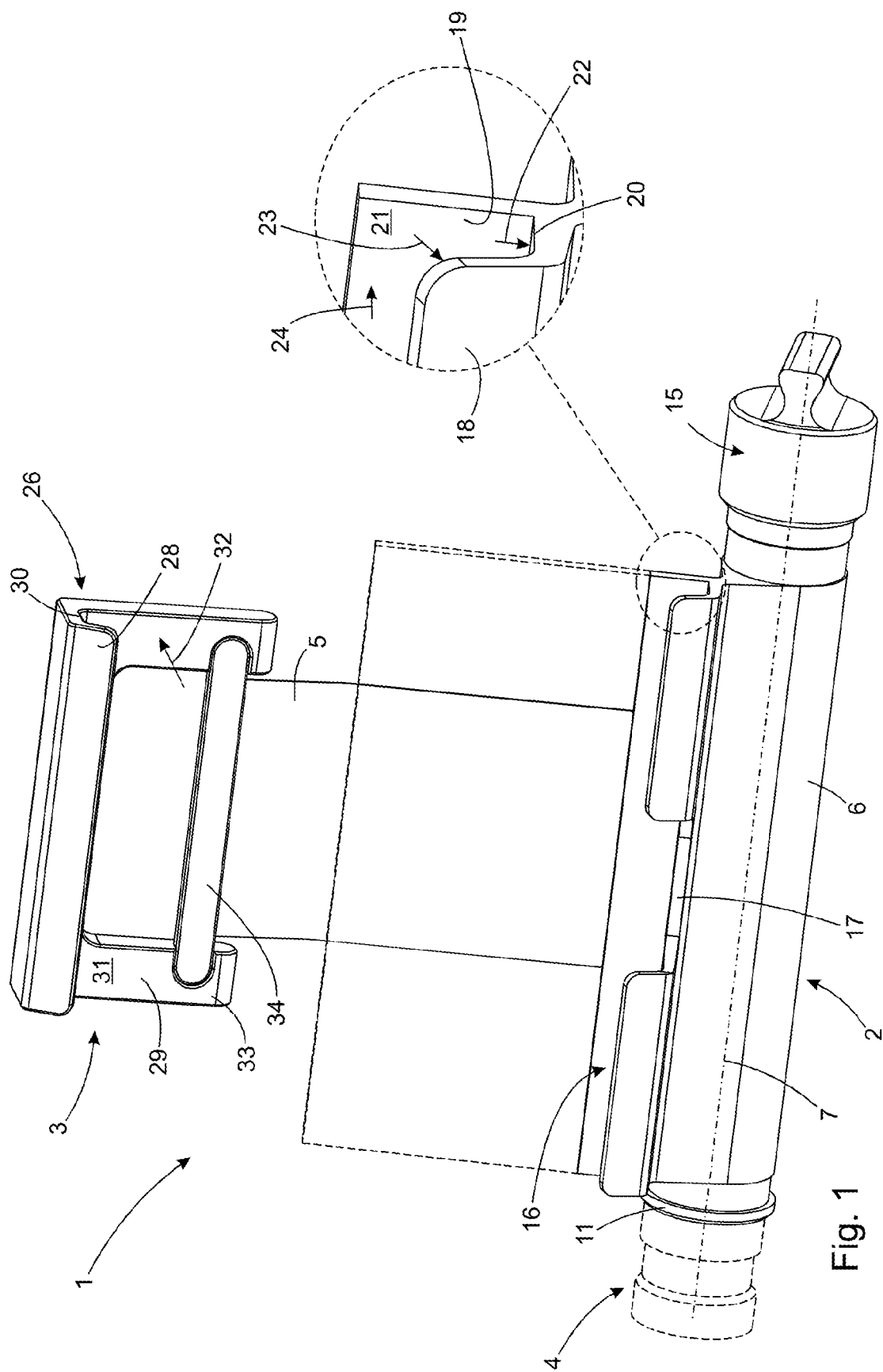
FIG. 1 a perspective representation of a holding gear with a first holder and a second holder arranged at a distance therefrom, which is connected to the first holder via a traction belt formed as a webbing, FIG. 2 a sectional view of the holding gear according to FIG. 1, FIG. 3 the main components of the holding gear as shown in FIGS. 1 and 2 from different perspectives, and FIG. 4 a detailed perspective representation of a blocking mechanism as it is realized with the holding gear according to FIGS. 1 to 3.

A holding gear 1 shown in FIGS. 1 and 2 is provided for fixing an object, for example a tablet computer, which is not shown in detail and which is in particular plate-shaped. The holding gear 1 comprises an interface 4 which is shown only schematically and only in FIG. 1, which interface 4 is arranged purely exemplarily laterally on a first holding gear 2 and is also referred to as a coupling arrangement and is designed for coupling the holding gear 1 with a supporting gear, for example a swivel arm, which is not shown in detail. The not shown swivel arm may in turn be attached to a fairing part or a fuselage part of an aircraft which is also not shown, e.g. a helicopter or a commercial aircraft. The interface 4, which is only shown schematically, is intended to be accommodated in a correspondingly designed accommodating section of the supporting gear, which is also not shown, without this being discussed in more detail.

In addition to the first holder 2, the holding gear 1 comprises a second holder 3, which is connected to the first holder 2, purely by way of example, with a traction belt in the form of a flexible textile webbing 5, which is attached to the first holder 2 in the manner described in more detail below and enables a change in distance between the first holder 2 and the second holder 3 and thus a fixing of a plate-shaped object between the first holder 2 and the second holder 3 which is not shown in more detail.

The first holder 2 comprises a housing part 6 which extends along an axis of extension 7 with an at least substantially constant profile and which has a recess 8 shown in FIG. 2 in which a winding mechanism 9 described in more detail below is accommodated. The already mentioned interface 4 is formed at a first end region 10 of the housing part 6, which extends along the axis of extension 7, purely as an example, from an end cover 11, which is accommodated in the recess 8 in a rotationally fixed manner. An actuating element 15 in the form of a rotary knob is arranged on a second end region 12 of the housing part 6, whereby the actuating element 15 is kinematically coupled to the winding mechanism 9 in the manner also described in more detail below.

A receiving section 16 is formed on an outer surface of the housing section 6, which receiving section 16 extends over the entire length of the housing section 6, apart from an interruption 17 in the middle area, and which receiving section 16 is profiled in a U-shape as an example. According to the design of FIGS. 1 and 2, a front U-leg 18 of the which receiving section 16 as shown in FIG. 1 is shorter than a rear U-leg 19 of the receiving section 16, whereby the rear U-leg 19 can also be considerably longer than the front U-leg 18, as symbolized by the dashed representation according to FIG. 1.

It is further provided that the two U-arms 18, 19 of the receiving section 16 are connected to each other by a connecting section 20 and that, purely exemplarily, the front U-arm 18 takes an angle of approx. 110 degrees with respect to the connecting section 20, while the rear U-arm 19 takes an angle of approx. 90 degrees with respect to the connecting section 20. An extension of the connecting portion 20 (transverse to the extension axis 7) is selected such that an unrepresented tablet computer of usual thickness can be accommodated in the accommodating portion or receiving section 16 such that an narrow side of the tablet computer (not shown) comes into planar contact with the connecting portion 20, while a rear side of the tablet computer comes into flat contact with a front side 21 of the rear U-leg 19 and a front side of the tablet computer has a line contact with respect to the inclined front U-leg 18.

If a thickness of the tablet computer is greater than the extension of the connecting section 20, the tablet computer is in flat contact against the front 21 of the rear U-leg 19 and has a line contact with the angled front U-leg 18. The interaction of the tablet computer, which is not described in detail, with the two U-limbs 18, 19 and, if necessary, the connecting section 20, ensures that the tablet computer is form-fittingly fixed in a direction 22 oriented normal to the connecting section 20 and in the directions 23 and 24 which are oriented normal with respect to the U-limbs 18 and 19.

The second holder 3 is formed purely exemplarily with a U-shaped profile along the axis of extension 7 and has, as shown in FIG. 1, a receiving section 26. The receiving section 26 comprises a front U-leg 28 and a rear U-leg 29 and a connecting section 30 which is provided between the front U-leg 28 and the rear U-leg 29. The connecting section 30 is aligned purely exemplarily at an angle of 90 degrees relative to the rear U-leg 29 and at an angle of approx. 110 degrees relative to the front U-leg 28. As can be seen from FIGS. 1 and 2, the rear U-leg 29 is considerably longer than the front U-leg 28 and is itself profiled U-shaped in relation to a surface normal 32 of a front side 31. Thus the second holder 3 is designed in the manner of a suitcase handle and can be easily grasped by an unrepresented user. A connecting web 34 is attached to one end area 33 of the rear U-leg 29, which is connected to the webbing 5 in an unspecified manner and thus ensures the force-transmitting coupling between the second holder 3 and the webbing 5.

As can be seen from the illustration in FIG. 2, the winding mechanism 9 is accommodated in a recess 8 of the housing part 6. The winding mechanism 9 comprises, by way of example, a winding shaft 40 extending over almost the entire length of the housing part 6, which winding shaft 40 is designed rotationally symmetrically to the first axis of extension 7 which is also the axis of rotation for the winding shaft 40. Furthermore, the winding mechanism 9 comprises a braking mechanism 41 associated with the end cover 11 and described in more detail below, a driver 42 and the actuating element 15, which in turn comprises a coupling part 43 and an actuating part 44. In addition, a spring gear in the form of a circular cylindrical spiral spring 47 is accommodated in a first recess 45 of the spiral shaft 40 and a coupling spring in the form of a circular cylindrical spiral spring 48 is accommodated in a second recess 46, the function of which is described in more detail below. As an example it is provided that the spiral spring 47 is fixed with a first end section 49 aligned along the extension axis 7 in an unspecified bore of the end cover 11 and with a second end section 50 aligned along the extension axis 7 in an unspecified bore of the winding shaft 40. It is further provided that the coil spring 48 is fixed with a first end portion 51 in an unspecified bore of the winding shaft 40 and with a second end portion 52 in an unspecified bore of the driver 42.

As an example, it is provided that the first recess 45 in the winding shaft 40 and a journal-shaped, in particular circular cylindrical shaped, projection 53 of the end cover 11 are adapted to one another in such a way that an unspecified circular cylindrical outer surface of the projection 53 serves as a slide bearing for the winding shaft 40. It is also provided that the projection 53 is designed for a bearing of a brake disc 54 which is of circular annular design and which is pressed by a circular cylindrical helical spring 55 against an axial end face 56 of the winding shaft 40. Preferably it is provided that the brake disc 54 and possibly the coil spring 55 are received non-rotatably on the end cover 11 in a manner not described in detail, so that a rotational movement of the winding shaft 40 about the extension axis 7 leads to a frictional torque with respect to the brake disc 54, whereby the rotational movement of the winding shaft 40 is braked.

The webbing 5 is wound up at a central portion 57 of the winding shaft 40 having a reduced diameter, so that a rotational movement of the winding shaft 40 about the extension axis 7 leads to a winding or unwinding of the webbing 5 onto the winding shaft 40 or from the winding shaft 40 depending on the respective direction of rotation. Furthermore, a rotational movement of the winding shaft 40 leads to a rotation of the end section 50 of the helical spring 47 relative to the end section 49 of the helical spring 47, as a result of which energy can be stored or released by the helical spring 47 as a function of the respective direction of rotation. It is preferably provided that the helical spring 47 and a winding direction for the webbing 5 wound on the winding shaft 40 are matched to each other such that for unwinding the webbing 5 from the winding shaft 40 an introduction of a traction force on the webbing 5 is required and leads to an energy storage in the helical spring 47, while a reduction of the traction force on the webbing 5 causes a winding of the webbing on the winding shaft 40 due to the energy stored in the helical spring 47.

It is also provided that the driver 42 is rotatably accommodated in the second recess 46 of the winding shaft 40 and, on the one hand, is in kinematic coupling with the winding shaft 40 via the helical spring 48, which is also referred to as the coupling spring, and, on the other hand, is in rotationally fixed and linearly movable operative connection with the coupling part 43 of the actuating element 15. For this purpose it is provided purely exemplarily that the driver 42, which is designed rotationally symmetrical in itself, has a recess 60 which extends as an elongated hole between an axial end face 58 and an axial bore 59 and through which an identically profiled guide section 61 of the coupling part 43 passes, with which a linearly movable and rotationally fixed coupling between driver 42 and coupling part 43 is realised.

Figure 4:
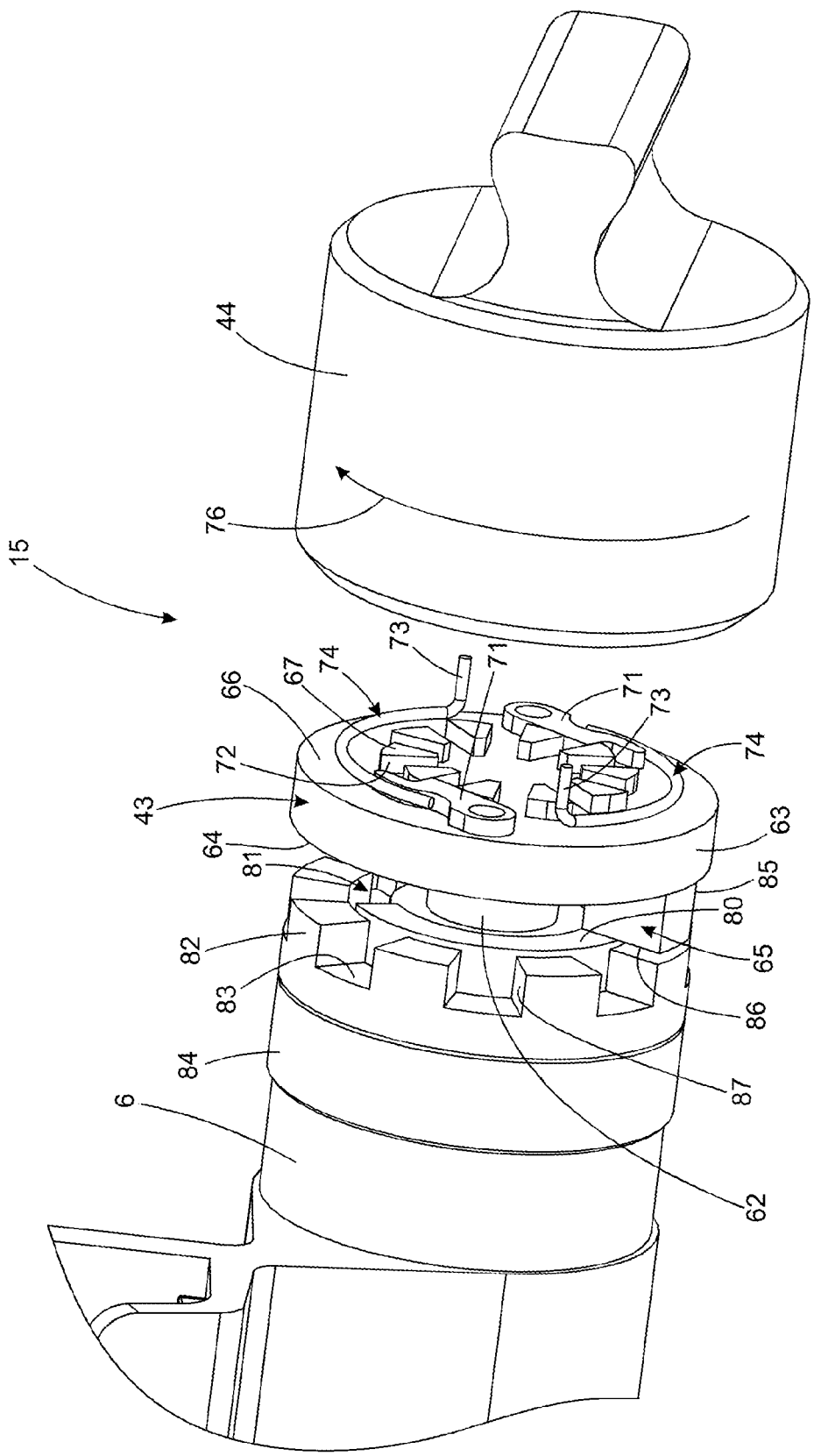

The coupling part 43 also has a cylinder section 62 accommodated in the axial bore 59 of the driver 42 and a control disc 63 axially connected thereto. A control projection 65 in the form of a circular ring section is formed on a first axial end face 64 of the control disc 63 while on a second axial end face 66 of the control disc 63 a plurality of locking cams 67, in particular annular section cams 67, are arranged which are shown more closely in FIG. 4 and which are aligned in a uniform angular division with respect to the axis of extension 7. Furthermore, the coupling part 43 comprises a spring carrier 68 which adjoins the guide section 61 and is realized with a circular-cylindrical design and is provided at the ends with a supporting disc 69 which has a larger diameter than the spring carrier 68. An axial spring in the form of a circular cylindrical helical spring 70 is arranged between the supporting disc 69 and the end face 58 of the driver 42, which axial spring is designed to exert a spring force directed to the left in accordance with the illustration in FIG. 2 on the head part 43 and is prestressed for this purpose in a corresponding manner.

Figure 3:
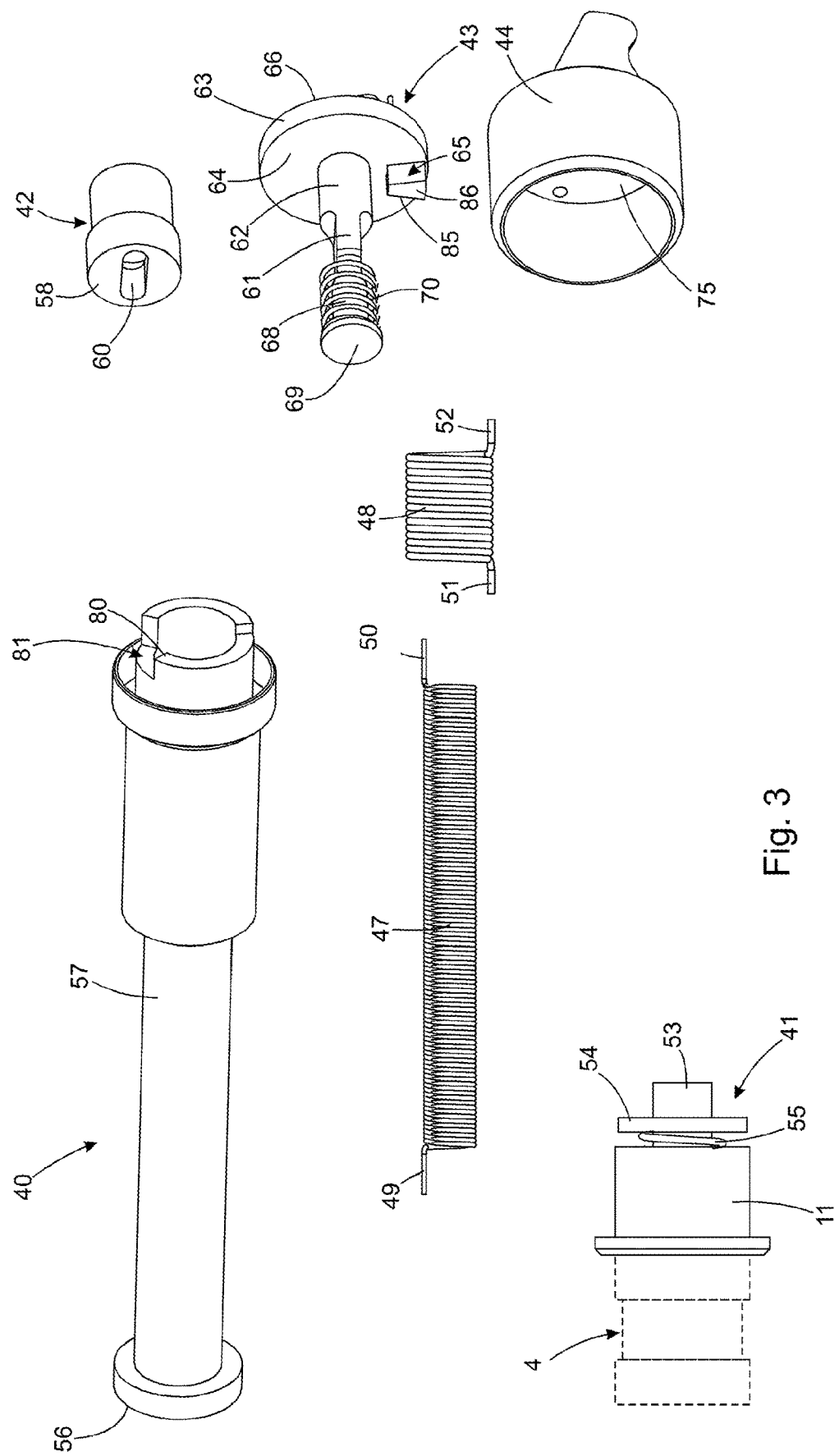

On the second end face 66 of the control disc 63, pawls 71 are arranged. The pawls 71 are kinematically associated with the actuating part 44 and are mounted pivotally movable on an axial face 75 of the actuating part 44 as shown in FIG. 3. The pawls 71 are provided in accordance with the illustration of FIG. 4 for a form-fitting abutment on side surfaces 72 of the locking cams 67 and are pressed in the radial direction inwards against the locking cams 67 in each case by means of arcuately formed locking bolts 74 which are fixed to an axial surface 75 in the actuating part 44 with an axially angled end region 73. As a result, the coupling part 43 and the actuating part 44 form a unidirectional freewheel. In this way, the actuating part 44 can be rotated freely in a non-drawn, first direction of rotation relative to the coupling part 43, without any significant torque transmission taking place for the function of the holding gear 1. On the other hand, when the actuating part 44 rotates in a second direction of rotation 76, torque is transmitted from the actuating part 44 to the coupling part 43, since in this case force can be transmitted from the actuating part 44 via the pawls 71 to the side surfaces 72 of the locking cams 67.

When the holding gear 1 is used, which in particular can be fixed to a supporting gear in an aircraft which is not shown in more detail, the following sequence can be provided: firstly, the second holder 3 is located at a minimum distance from the first holder 2, whereby the helical spring 47, which is accommodated in the winding shaft 40, is pre-tensioned in such a way that the webbing 5 is always subjected to a traction force irrespective of winding or unwinding from the winding shaft 40. Furthermore, it is provided that the actuating element 15 assumes a release position in which there is a greater axial distance between the actuating element 15 and the housing part 6 than in a blocking position described in more detail below.

If a user now wishes to accommodate a plate-shaped object, in particular a tablet computer, which is not described in more detail, by means of the holding gear 1, it is first provided that the user manually increases the distance between the first holder 2 and the second holder 3 by gripping the second holder 3 and by applying a traction force to the second holder 3. In the course of this increase of distance, the webbing 5 is unwound from the winding shaft 40 against the restoring force of the spiral spring 47. Due to the rotation of the winding shaft 40 around the extension axis 7, torsion of the spiral spring 47 takes place around the extension axis 7, so that a portion of the traction force introduced by the user can be stored as deformation energy in the elastically deformed spiral spring 47. As soon as a distance between the second holder 3 and the first holder 2 is sufficient, the plate-shaped object (not shown) can be inserted between the two receiving sections 16 and 26 of the first holder 2 and the second holder 3. At this point it is intended that the user reduces the operating force to the second holder 3 until a force equilibrium is achieved between the operating force applied by the user and the traction force exerted by the winding shaft 40 caused by the spiral spring 47.

As the user continues to reduce the operating force, the torque from the spiral spring 47 to the winding shaft 40 causes a winding movement for the webbing 5 to the winding shaft 40, so that a distance between the second holder 3 and the first holder 2 is reduced until the plate-shaped object is held between the two receiving sections 16 and 26. In order to ensure an advantageous operability of the holding gear 1, the restoring force/torque of the spiral spring 47 and the resulting traction force of the winding shaft 40 on the webbing 5 is located at a rather low level, which ensures a reliable winding of the webbing 5 on the winding shaft 40 is guaranteed, but no considerably higher traction force is applied to the webbing 5.

Depending on an application for the holding gear 1 and a weight of the plate-shaped object, the situation may arise in which the traction force generated by the spiral spring 47 for the fixation of the plate-shaped object is not sufficient such that the fixation would fulfil all application conditions within the scope of an intended use for the holding gear 1.

In order to achieve a reliable fixation of the plate-shaped object in the holding gear 1 which, for example, fulfils all conditions of use for the intended use of the holding gear 1, in particular in an aircraft, the holding gear 1 offers the user the possibility to apply an additional traction force to the traction belt 5. For this purpose, it is provided that the user initiates a rotational movement in the second direction of rotation 76 on the actuating element 15, in which a torque initiated by the user on the actuating gear 40 is transmitted via the pawls 71 to the locking cams 67 due to the locking effect of the pawls 71. Since the coupling part 43 provided with the locking cams 67 is coupled with its guide section 61 rotationally fixed and linearly movable with the driver 42, torque is transmitted from the coupling part 43 to the driver 42.

The driver 42 in turn is kinematically coupled to the winding shaft 40 via the helical spring 48, so that the torque transmitted to the driver 42 acts on the winding shaft 40 in addition to the torque of the helical spring 47 and thus leads to an increase in the traction force provided by the helical spring 47 on the webbing or traction belt 5. When the torque applied by the user to the actuator 15 is increased, the elastic deformation of the spiral spring 48 caused by the reaction forces of the traction belt 5 results in a rotational relative movement between the actuator 15 and the winding shaft 40. Here the control projection 65 of the head part 43 with its end face 86 covers a control face 80 on the end face of the winding shaft 40, which control face 80 is designed as a circular ring section. The control face 80 initially prevents an axial approach movement of the actuating element 15 to the housing part 6 in the direction of the extension axis 7.

Only when the control projection 65 has completely covered the control surface 80 can it be immersed in a recess 81 of the winding shaft 40. A radial extension of the control projection 65 is designed in such a way that it additionally also sweeps over the projections 82 and recesses 83, which are shown in greater detail in FIG. 4, realized on the end face of the housing part 6. Thus an axial movement of the actuating element 15 along the extension axis 7 for approaching the housing part 6 is only possible if the control projection 65 can immerse both in the recess 81 and in a recess 83. As soon as the control projection 65 can be immersed in the recess 81 and in the recess 83, a support surface 85 of the control projection 65 comes into contact with a support surface 87 in the recess 83 of the housing part 6, whereby a common torque support between actuating element 15, winding shaft 40 and housing part 6 and thus the desired blocking of the actuating element 15 is achieved.

These design measures ensure that the user must initiate at least a minimum torque on the actuating element 15 before immersion in the recess 81 is possible. In addition, this ensures that by simultaneously immersing the control projection 65 in the recess 81 and in one of the recesses 83, a support of the actuating element 15 on the housing part 6 and thus the desired blocking effect for the actuating element 15 can be achieved.

Since the actuating element 15 is held in the blocking position due to the axial pretension of the coil spring 70, the fixing process for the plate-shaped object is thus completed. As an example, a marking ring 84 can be formed on the housing part 6, which is covered by the actuating element 15 in the blocking position and which is visible for a user in the release position. For example, the marking ring 84 is set off in colour from the housing part 6, in particular by a red colour, so that in the event that the actuating element 15 has not yet taken up the blocking position, it is signalled to the user that the fixing of the plate-shaped object has not yet been completed.

In order to remove the plate-shaped object from the holding gear 1, it is provided that a user first exerts an axial force on the actuating element 15 in order to displace this along the axis of extension 7 against the pretension of the helical spring 70 and thereby simultaneously move the control projection 65 out of the recess 81 and the recess 83. The user then first manually supports the torque applied by the coil spring 48 to the winding shaft 40 and then allows the actuator 15 to rotate against the second direction of rotation 76, releasing the tension from the coil spring 48.

The user can then manually grasp the second holder 3 and increase the distance between the second holder 3 and the first holder 2 to remove the plate-shaped object from the holding gear 1 while unwinding the holding gear 5 from the winding shaft 40. The user can then reduce the traction force applied to the second holder 3 so that the energy stored in the spiral spring 47 causes the webbing 5 to be wound onto the winding shaft 40 and a distance between the second holder 3 and the first holder 2 is reduced until the second holder 3 assumes its initial position relative to the first holder 2.

What is claimed is:

1. A holding gear for temporarily fixing a plate-shaped object, in particular a tablet computer, comprising a first holder, which has a coupling arrangement for connection to a supporting gear and which has a first receiving section for positively receiving a first narrow side of the plate-shaped object at least in two spatial directions, and comprising a second holder, which has a second receiving section for positively receiving a second narrow side of the plate-shaped object at least in two spatial directions, and which comprises a flexible traction belt which is connected to the first holder and to the second holder and which is designed for a transmission of a traction force between the first holder and the second holder for fixing the plate-shaped object,
    wherein the first holder is associated with a winding apparatus having a winding shaft which is rotatably mounted on the first holder and looped around by an end region of the traction belt and which is designed for winding up and unwinding the traction belt, and
    wherein the winding shaft is associated with a prestressed spring arrangement supported on the first holder for providing a traction force on the traction belt dependent on a distance of the second holder from the first holder, and/or wherein a winding axis of the winding shaft is aligned parallel to the extension axis of the first receiving section.

2. The holding gear according to claim 1, wherein the first receiving section and/or the second receiving section has a U-shaped profile with a shorter U-leg and a longer U-leg, and wherein the traction belt is attached to the longer U-leg.

3. The holding gear according to claim 1, wherein the winding shaft is assigned a blocking mechanism for a rotationally fixed fixing of the winding shaft to the first holder, which blocking mechanism comprises an actuating element which is designed for manual introduction of torque onto the winding shaft.

4. A holding gear for temporarily fixing a plate-shaped object, in particular a tablet computer, comprising a first holder, which has a coupling arrangement for connection to a supporting gear and which has a first receiving section for positively receiving a first narrow side of the plate-shaped object at least in two spatial directions, and comprising a second holder, which has a second receiving section for positively receiving a second narrow side of the plate-shaped object at least in two spatial directions, and which comprises a flexible traction belt which is connected to the first holder and to the second holder and which is designed for a transmission of a traction force between the first holder and the second holder for fixing the plate-shaped object,
    wherein the first holder is associated with a winding apparatus having a winding shaft which is rotatably mounted on the first holder and looped around by an end region of the traction belt and which is designed for winding up and unwinding the traction belt, and
    wherein the winding shaft is assigned a blocking mechanism for a rotationally fixed fixing of the winding shaft to the first holder, which blocking mechanism comprises an actuating element which is designed for manual introduction of torque onto the winding shaft, and
    wherein a coupling spring is provided for force-transmitting coupling of the actuating element to the winding shaft, wherein on the first holder and on the actuating element corresponding supporting surfaces for torque support between actuating element and first holder are formed.

5. A holding gear for temporarily fixing a plate-shaped object, in particular a tablet computer, comprising a first holder, which has a coupling arrangement for connection to a supporting gear and which has a first receiving section for positively receiving a first narrow side of the plate-shaped object at least in two spatial directions, and comprising a second holder, which has a second receiving section for positively receiving a second narrow side of the plate-shaped object at least in two spatial directions, and which comprises a flexible traction belt which is connected to the first holder and to the second holder and which is designed for a transmission of a traction force between the first holder and the second holder for fixing the plate-shaped object, wherein the first holder is associated with a winding apparatus having a winding shaft which is rotatably mounted on the first holder and looped around by an end region of the traction belt and which is designed for winding up and unwinding the traction belt, and wherein the winding shaft is assigned a blocking mechanism for a rotationally fixed fixing of the winding shaft to the first holder, which blocking mechanism comprises an actuating element which is designed for manual introduction of torque onto the winding shaft, and wherein the actuating element is mounted on the winding shaft so as to be linearly movable between a release position and a blocking position, and wherein an axial spring is arranged between the winding shaft and the actuating element for determining the blocking position as the preferred position for the actuating element, the actuating element and the winding shaft having mutually corresponding control surfaces for presetting an angular position between the actuating element and the winding shaft for assuming the blocking position.

6. A holding gear for temporarily fixing a plate-shaped object, in particular a tablet computer, comprising a first holder, which has a coupling arrangement for connection to a supporting gear and which has a first receiving section for positively receiving a first narrow side of the plate-shaped object at least in two spatial directions, and comprising a second holder, which has a second receiving section for positively receiving a second narrow side of the plate-shaped object at least in two spatial directions, and which comprises a flexible traction belt which is connected to the first holder and to the second holder and which is designed for a transmission of a traction force between the first holder and the second holder for fixing the plate-shaped object, wherein the first holder is associated with a winding apparatus having a winding shaft which is rotatably mounted on the first holder and looped around by an end region of the traction belt and which is designed for winding up and unwinding the traction belt, and wherein the winding shaft is assigned a blocking mechanism for a rotationally fixed fixing of the winding shaft to the first holder, which blocking mechanism comprises an actuating element which is designed for manual introduction of torque onto the winding shaft, and wherein the actuating element comprises an actuating part and a coupling part, wherein the coupling part is designed for force transmission from the actuating part to the coupling spring and wherein the actuating part is mounted on the coupling part unidirectionally rotationally movable.

7. The holding gear according to claim 1, wherein the first holder and/or the second holder are designed as an aluminium extrusion.

* * * * *